United States Patent
Stoesser et al.

(10) Patent No.: US 7,312,363 B2
(45) Date of Patent: Dec. 25, 2007

(54) METHOD FOR ACTIVATING DOUBLE METALLOCYANIDE-COMPOUNDS

(75) Inventors: Michael Stoesser, Neuhofen (DE); Edward Bohres, Ludwigshafen (DE); Georg Heinrich Grosch, Bad Duerkheim (DE); Wilfried Sager, Mutterstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 153 days.

(21) Appl. No.: 10/502,803

(22) PCT Filed: Feb. 6, 2003

(86) PCT No.: PCT/EP03/01174

§ 371 (c)(1),
(2), (4) Date: Aug. 6, 2004

(87) PCT Pub. No.: WO03/066706

PCT Pub. Date: Aug. 14, 2003

(65) Prior Publication Data

US 2005/0159627 A1   Jul. 21, 2005

(30) Foreign Application Priority Data

Feb. 7, 2002   (DE) ............................... 102 05 086

(51) Int. Cl.
*C07C 41/03* (2006.01)
*B01J 27/26* (2006.01)

(52) U.S. Cl. ............... 568/618; 568/620; 568/679
(58) Field of Classification Search ............... 568/618, 568/620

See application file for complete search history.

(56) References Cited

U.S. PATENT DOCUMENTS 3,829,505 A * 8/1974 Herold ............... 568/606
6,410,676 B1 * 6/2002 Yamasaki et al. ............ 528/76
6,486,361 B1 * 11/2002 Ehlers et al. ............... 568/620

FOREIGN PATENT DOCUMENTS

| EP | 0 026 546 | * | 4/1981 |
| EP | 755 716 | | 1/1997 |
| EP | 862 977 | | 9/1998 |
| EP | 892 002 | | 1/1999 |
| WO | 98/52689 | | 11/1998 |
| WO | 01/10933 | | 2/2001 |

* cited by examiner

*Primary Examiner*—Rosalynd Keys
(74) *Attorney, Agent, or Firm*—Oblon, Spivak, McClelland, Maier & Neustadt, P.C.

(57) ABSTRACT

The present invention relates to a process for reacting epoxides with an initiator compound in the presence of a double metal cyanide compound as a catalyst, said process having a shortened induction period, and the double metal cyanide compound being activated by adding the epoxide to a mixture of double metal cyanide compound and initiator compound at an internal reactor pressure of less than 1 bar, and also to the polyethers themselves obtainable by such a process.

3 Claims, No Drawings

METHOD FOR ACTIVATING DOUBLE METALLOCYANIDE-COMPOUNDS

The present invention relates to a process for reacting epoxides with an initiator compound in the presence of a double metal cyanide compound as a catalyst, said process having a shortened induction period, and the double metal cyanide compound being activated by adding the epoxide to a mixture of double metal cyanide compound and initiator compound at an internal reactor pressure of less than 1 bar, and also to the polyethers themselves obtainable by such a process.

The literature discloses that double metal cyanide compounds (DMC compounds) may be used as catalysts for reacting initiator molecules having active hydrogen with epoxides, for example in a polymerization reaction. The ring-opening polymerizations of alkylene oxides are described, for example, in EP-A 0 892 002, EP-1 0 862 977 and EP-A 0 755 716. DMC compounds have a high catalytic activity in the polymerization of epoxides. Nevertheless, the prior art discloses disadvantages of these catalysts, for example an induction period to be observed at the beginning of the reaction.

An induction period means that the catalyst is not immediately active, but rather only attains its activity in contact with the initiator compound and the epoxide after a certain time. This induction period manifests itself in that, for example, after a small amount of epoxide is metered in, a certain pressure in the reactor results which remains constant for a certain time and falls quickly at the end of the induction period. After the pressure drop, the catalyst is active and further epoxide can be metered in.

There is hitherto no known explanation for the reaction during this induction period. The induction period for activating a DMC compound lasts, for example, for between a few minutes and a few hours. This induction period leads to various problems when using DMC compounds as catalysts. For instance, there is free epoxide in the reactor during the induction period, which can lead to safety problems. This is the case especially when the catalyst does not light off despite very long waiting times. Furthermore, free epoxide which is in the reactor at high temperatures for a long time can enter into secondary reactions.

Examples of such secondary reactions include the isomerization of the epoxide to the corresponding aldehyde or a rearrangement to the allyl alcohol. These secondary reactions lead to undesired by-products which necessitate a costly and inconvenient purification of the products.

Furthermore, a long induction period leads to a loss of reactor capacity which makes the process more expensive.

In order to remedy these disadvantages, various processes have already been described in the prior art which shorten the induction period when activating DMC compounds.

For instance, WO 98/52689 describes a process for shortening the induction period in which, in addition to the conventional low-pressure treatment of the initiator/DMC mixture, further measures for treating this mixture are carried out. An example of such a measure according to WO 98/52689 is the introduction of gaseous nitrogen. Such a process entails major technical alterations to the apparatus to be used. Furthermore, the time-consuming dewatering leads to loss of reactor capacity which makes the product even more expensive.

WO 01/10933 describes a process for shortening the induction period in which the epoxide pressure in the reactor is kept constant by continuously metering in epoxide. This process also harbors the risk of an accumulation of epoxide which in turn leads to the abovementioned problems for safety and quality of the products.

It is an object of the present invention to provide, starting from the prior art, a process in which a shortening of the induction period is achieved without entailing major technical alterations in existing plants for DMC-catalyzed reaction of epoxides.

We have found that this object is achieved by a process for reacting epoxides with an initiator compound in the presence of a double metal cyanide compound as a catalyst, said process having a shortened induction period and comprising at least the stage (1):

(1) activating the double metal cyanide compounds by adding the epoxide to a mixture of double metal cyanide compound and initiator compound at an internal reactor pressure of less than 1 bar.

The metering of the epoxide into the evacuated reactor at an internal reactor pressure of less than 1 bar surprisingly achieves immediate light-off of the reaction. This is all the more astonishing in that it is generally assumed that a certain elevated epoxide pressure is necessary at the beginning of the induction period for the activation of the DMC compound. The elevated epoxide pressure was thought to lead to an increase in the solubility of the epoxide in the mixture of DMC compound and initiator compound.

According to the invention, the internal reactor pressure on addition of the epoxide is less than 1 bar. In other words, after the conventional low pressure treatment of the mixture of double metal cyanide compound and initiator compound at elevated temperatures, the vacuum is only partially broken, if at all, for example using nitrogen, and the epoxide is then introduced into the reactor at the reaction temperature and an internal pressure of less than 1 bar, preferably less than 500 mbar, in particular less than 200 mbar, more preferably less than 100 mbar, for example less than 50 mbar.

In a preferred embodiment, the present invention therefore relates to a process for reacting epoxides with an initiator compound in the presence of a double metal cyanide compound as a catalyst, said process having a shortened induction period, and the internal reactor pressure at the addition of stage (1) being less than 500 mbar.

According to the invention, it is also possible that, in addition to the low pressure treatment of the mixture of DMC compound and initiator compound, further treatment steps are effected, as disclosed, for example, in WO 98/52689.

Useful initiator compounds are any compounds which have an active hydrogen. According to the invention, preferred initiator compounds are OH-functional compounds.

According to the invention, examples of useful initiator compounds include the following compounds: water, organic dicarboxylic acids such as succinic acid, adipic acid, phthalic acid and terephthalic acid, aliphatic and aromatic, optionally N-mono-, N,N- and N,N'-dialkyl-substituted diamines having from 1 to 4 carbon atoms in the alkyl radical, such as optionally mono- and dialkyl-substituted ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamine, 2,3-, 2,4- and 2,6-tolylenediamine and 4,4'-, 2,4'- and 2,2'-diaminodiphenylmethane. Further useful starting molecules include alkanolamines, e.g. ethanolamine, N-methyl- and N-ethylethanolamine, dialkanol-amines, e.g. diethanolamine, N-methyl- and N-ethyldiethanolamine, and trialkanolamines, e.g. triethanolamine, and ammonia and also mono- or polyhydric alcohols, such as monoethylene glycol, propane-1,2- and -1,3-diol, diethylene glycol, dipropylene glycol, butane-1,4-diol, hexane-1,6-diol, glycerol, trimethylolpropane, pentaerythritol, sorbitol and sucrose. The polyether polyalcohols used are preferably addition products of ethylene oxide and/or propylene oxide to water, monoethylene glycol, diethylene glycol, propane-1,2-diol, dipropylene glycol, glycerol, trimethylolpropane, ethylenediamine, triethanolamine, pentaerythritol, sorbitol and/or sucrose, individually or in mixtures.

According to the invention, the initiator compounds may also be in the form of alkoxylates, in particular those having a molecular weight $M_w$ in the range from 62 to 15 000 g/mol.

However, equally suitable are macromolecules having functional groups which have active hydrogen atoms, for example hydroxyl groups, in particular those specified in WO 01/16209.

Especially preferred initiator compounds are monofunctional or polyfunctional alcohols having from 2 to 24 carbon atoms, and particular preference is given according to the invention to initiator compounds having from 8 to 15 carbon atoms, in particular from 10 to 15 carbon atoms, for example triethanol.

Alcohols suitable according to the invention are thus in particular octanol, nonanol, decanoyl, undecane, dodecanol, triethanol, tetradecanol, pentadecanol, iso-octanol, iso-nonanol, iso-decanoyl, iso-undecane, iso-dodecanol, iso-triethanol, iso-tetradecanol, iso-pentadecanol, preferably iso-decanoyl, 2-propylheptanol, triethanol, iso-triethanol or mixtures of C13- to C15-alcohols.

Useful DMC compounds are in principle any suitable compounds known to those skilled in the art.

Examples of DMC compounds useful as catalysts are those described in WO 99/16775 and DE 10117273.7. According to the invention, the double metal cyanide compounds of the general formula I in particular are used as catalysts for the process according to the invention:

$$M^1{}_a[M^2(CN)_b(A)_c]_d \cdot fM^1{}_gX_n \cdot h(H_2O) \cdot eL \cdot kP \qquad (I),$$

where $M^1$ is at least one metal ion selected from the group consisting of $Zn^{2+}$, $Fe^{2+}$, $Fe^{3+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{4+}$, $V^{5+}$, $Sr^{2+}$, $W^{4+}$, $W^{6+}$, $Cr^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$, $Cu^{2+}$, $La^{3+}$, $Ce^{3+}$, $Ce^{4+}$, $Eu^{3+}$, $Ti^{3+}$, $Ti^{4+}$, $Ag^+$, $Rh^{2+}$, $Rh^{3+}$, $Ru^{2+}$ and $Ru^{3+}$, $M^2$ is at least one metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$ and $Ir^{3+}$, A and X are each independently an anion selected from the group consisting of halide, hydroxide, sulfate, carbonate, cyanide, thiocyanate, isocyanate, cyanate, carboxylate, oxalate, nitrate, nitrosyl, hydrogensulfate, phosphate, dihydrogenphosphate, hydrogenphosphate and hydrogencarbonate, L is a water-miscible ligand selected from the group consisting of alcohols, aldehydes, ketones, ethers, polyethers, esters, polyesters, polycarbonate, ureas, amides, primary, secondary and tertiary amines, ligands containing pyridine nitrogen, nitriles, sulfides, phosphides, phosphites, phosphines, phosphonates and phosphates, k is a fraction or integer greater than or equal to zero, and P is an organic additive, a, b, c, d, g and n are selected in such a way that the electrical neutrality of compound (I) is ensured, where c may be 0, e is the number of ligand molecules and is a fraction or integer greater than 0 or is 0, f, k, h and m are each independently a fraction or integer greater than 0 or are 0.

Organic additives P include polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylamide-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkylenimines, copolymers of maleic acid and maleic anhydride, hydroxyethylcellulose, polyacetates, ionic surface-active and interface-active compounds, bile acid or its salts, esters or amides, carboxylic esters of polyhydric alcohols and glycosides.

These catalysts may be crystalline or amorphous. In the case that k is equal to zero, preference is given to crystalline double metal cyanide compounds. In the case that k is greater than zero, preference is given to crystalline, semicrystalline and also substantially amorphous catalysts.

There are various preferred embodiments of the modified catalysts. One preferred embodiment involves catalysts of the formula (I) where k is greater than zero. The preferred catalyst then comprises at least one double metal cyanide compound, at least one organic ligand and at least one organic additive P.

In another preferred embodiment, k is equal to zero, e is optionally also zero and X is exclusively a carboxylate, preferably formate, acetate and propionate. Such catalysts are described in WO 99/16775. In this embodiment, preference is given to crystalline double metal cyanide catalysts. Preference is further given to double metal cyanide catalysts as described in WO 00/74845 which are crystalline and platelet-shaped.

The modified catalysts are prepared by combining a metal salt solution with a cyanometallate solution, each of which may optionally comprise both an organic ligand L and an organic additive P. The organic ligand and optionally the organic additive are added subsequently. In a preferred embodiment of the catalyst preparation, an inactive double metal cyanide phase is first prepared and this is then converted to an active double metal cyanide phase by recrystallization, as described in PCT/EP01/01893.

In another preferred embodiment of the catalysts, none of f, e and k are equal to zero. These are double metal cyanide catalysts which comprise a water-miscible organic ligand (generally in amounts from 0.5 to 30% by weight) and an organic additive (generally in amounts from 5 to 80% by weight), as described in WO 98/06312. The catalysts may either be prepared with vigorous stirring (24 000 rpm using Turrax) or with stirring as described in U.S. Pat. No. 5,158,922.

Useful catalysts for the process according to the invention are in particular double metal cyanide compounds which comprise zinc, cobalt or iron, or two thereof. Particular preference is given, for example, to Prussian blue.

According to the invention, preference is given to using crystalline DMC compounds. In a preferred embodiment, a crystalline DMC compound of the Zn—Co type which comprises zinc acetate as a further metal salt component is used as a catalyst. Such compounds crystallize in a monoclinic structure and have a platelet-shaped habit. Such compounds are described, for example, in WO 00/74845 or PCT/EP01/01893.

DMC compounds useful as catalysts for the process according to the invention may in principle be prepared by any means known to those skilled in the art. For example, the DMC compounds may be prepared by direct precipitation, the incipient wetness method, or by preparing a precursor phase and subsequent recrystallization.

For the process according to the invention, the DMC compounds may be used as powder, paste or suspension, or shaped to give a shaped body, incorporated into shaped bodies, foams or the like, or applied to shaped bodies, foams or the like.

The catalyst concentration used in the process according to the invention, based on the final amount structure, is, according to the invention, less than 2000 ppm, preferably less than 1000 ppm, in particular less than 500 ppm, more preferably less than 100 ppm, for example less than 50 ppm.

The epoxides used for the process according to the invention may in principle be any suitable epoxides. Examples of suitable epoxides include $C_2$-$C_{20}$-alkylene oxides such as ethylene oxide, propylene oxide, 1,2-butylene oxide, 2,3-butylene oxide, isobutylene oxide, pentene oxide, hexene oxide, cyclohexene oxide, styrene oxide, dodecene epoxide, octadecene epoxide and mixtures of these epoxides. Particularly suitable epoxides are ethylene oxide, propylene oxide, 1,2-butylene oxide, 2,3-butylene oxide and pentene oxide, although particular preference is given to propylene oxide, 1,2-butylene oxide, 2,3-butylene oxide and isobutylene oxide.

In a preferred embodiment, the present invention therefore relates to a process reacting epoxides with an initiator compound in the presence of a double metal cyanide compound as a catalyst, said process having a shortened induction period and the epoxide being propylene oxide or butylene oxide or a mixture of one of these epoxides with at least one further epoxide.

According to the invention, after completed activation of the DMC compound, the internal reactor pressure is brought to above 1 bar by adding inert gas, for example nitrogen. However, it is likewise possible according to the invention that no additional inert gas is added after the activation.

In a further embodiment, the present invention therefore relates to a process for reacting epoxides with an initiator compound in the presence of a double metal cyanide compound as a catalyst, said process having a shortened induction period and, after the activation of the double metal cyanide compound according to stage (1), the internal reactor pressure not being increased by adding inert gas.

In an alternative embodiment, the present invention relates to a process for reacting epoxides with an initiator compound in the presence of a double metal cyanide compound as a catalyst, said process having a shortened induction period and, after the activation of the double metal cyanide compound according to stage (1), the internal reactor pressure being increased by adding inert gas.

Even in the case that no additional inert gas is added, the internal reactor pressure may rise toward the end of the reaction to internal reactor pressures of 1 bar or higher. This may result, for example, from increasing volume of the product or from traces of inert gas which may be dissolved in the epoxide. The inert gases dissolved in the epoxide are not comprehended as additions of inert gas for the purposes of the invention.

Within the scope of the present invention, preference is given to adding at least 5% of the total amount of epoxide used in the process at an internal reactor pressure of less than 1 bar. This 5% of the total amount of the epoxide used in the process may be added in its entirety in the reaction of stage (1) or be divided between the reactions of stage (1) and stage (2).

In a further embodiment, the present invention therefore relates to a process for reacting epoxides with an initiator compound in the presence of a double metal cyanide compound as a catalyst, said process having a shortened induction period and at least 5% of the total amount of the epoxide used in the process being added at an internal reactor pressure of less than 1 bar.

According to the invention, preference is given to a process in which the addition of at least 5% of the total amount of the epoxide used in the process is divided between the reactions of stage (1) and stage (2) at an internal reactor pressure of less than 1 bar.

When ethylene oxide is used in the process according to the invention, preference is given to metering some inert gas into the reactor, so that the internal reactor pressure is between 500 and 950 mbar.

According to the invention, the activation of the double metal cyanide compound of stage (1) may be followed by a stage (2). According to the invention, stage (2) comprises a reaction of the initiator compound with an epoxide in the presence of the activated DMC compound. The reaction of stage (2) may be, for example, the addition of one or more epoxide molecules. Within the scope of the present invention, preference is given in particular to the reaction of stage (2) being a polymerization of an epoxide in the presence of a DMC compound activated according to stage (1).

In a preferred embodiment, the present invention therefore relates to a process for reacting epoxides with an initiator compound in the presence of a double metal cyanide compound as a catalyst, said process having a shortened induction period and the process comprising a stage (2):

(2) polymerizing an epoxide in the presence of a double metal cyanide compound activated according to stage (1).

For the purposes of the present invention, the epoxide polymerized may be any desired epoxide. According to the invention, it is possible that the second epoxide is different to the epoxide used for activating the DMC compound. However, it is equally possible for the purposes of the present invention that the epoxide used for activating the DMC compound and the epoxide used for the polymerization are identical.

Furthermore, the present invention also relates to a polyether obtainable by a process comprising the reaction of epoxides with an initiator compound in the presence of a double metal cyanide compound as a catalyst, said process having a shortened induction period and comprising at least the stage (1):

(1) activating the double metal cyanide compounds thereby adding the epoxide to a mixture of double metal cyanide compound and initiator compound at an internal reactor pressure of less than 1 bar.

In further preferred embodiments, the present invention relates to polyethers which were prepared using, as the epoxide, propylene oxide or butylene oxide or a mixture of one of these epoxides with at least one further epoxide.

In a further embodiment, the present invention likewise relates to polyethers which were prepared using, as the initiator compound, a monofunctional or polyfunctional alcohol having from 2 to 24 carbon atoms.

The polyethers according to the invention or the polyethers prepared according to the invention may be used in particular as carrier oils, fuel additives, surfactants or polyethers for the polyurethane synthesis.

The present invention is illustrated hereinbelow with the aid of examples.

EXAMPLES

Catalyst Synthesis

In a stirred tank of capacity 30 l equipped with a propeller stirrer, an immersed pipe for metering, a pH probe and a scattered light probe, 16 000 g of aqueous hexacyanocobaltic acid (cobalt content: 9 g/l) were initially charged and heated with stirring to 50° C. 9224 g of aqueous zinc acetate dihydrate solution (zinc content: 2.6% by weight) which had likewise been heated to 50° C. were then added within 15 minutes with stirring at a stirrer output of 0.4 W/l.

351 g of Pluronic® PE 6200 (BASF AG) were added to this precipitate suspension and the mixture was stirred for a further 10 minutes.

A further 3690 g of aqueous zinc acetate dihydrate solution (zinc content: 2.6% by weight) were then metered in within 5 minutes with stirring at a stirring energy of 1 W/l.

The suspension was stirred for a further 2 hours. Within this time, the pH fell from 4.02 to 3.27 and then remained constant. The precipitate suspension obtained in this way was then filtered and washed on the filter with 6 times the cake volume of water.

The damp filter cake was dried and dispersed in Tridekanol® N by means of a slotted rotor mill. The resulting suspension had a multimetal cyanide content of 5% by weight.

Example

In a 10 l autoclave equipped with a pitched-blade stirrer, temperature measurement and epoxide metering, the amounts of initiator and DMC specified in table 1 were initially charged. The initiator/DMC mixture was subsequently dewatered at 100° C. under a vacuum of 10 mbar. The autoclave was then brought to the reaction temperature specified in table 1. The amount of epoxide specified in table 1 was then metered into the evacuated autoclave. In these experiments, no induction period was observed. The reaction lit off immediately. The internal reactor pressure attained at the end of the reaction is reported in table 1.

Comparative Example

In a 10 l autoclave equipped with a pitched-blade stirrer, temperature measurement and epoxide metering, the amounts of initiator and DMC specified in table 1 were initially charged. The initiator/DMC mixture was subsequently dewatered at 120° C. under vacuum (10 mbar). The vacuum was then broken using nitrogen and the internal reactor pressure was set to a value of greater than 1 bar. The autoclave was then brought to the reaction temperature specified in table 1. The amount of epoxide specified in table 1 was then metered into the autoclave. The induction periods observed can be found in table 1. The internal reactor pressure attained at the end of the reaction is reported in table 1.

| Experiment | Initiator | Initiator amount [g] | Epoxide | Epoxide amount [g] | Catalyst amount [g] | Temperature [° C.] | Induction time [min] | Internal pressure [bar] |
|---|---|---|---|---|---|---|---|---|
| 1 | Tridecanol | 1200 | PO | 5220 | 1.3 | 140 | 0 | 1.8 |
| 2 | Tridecanol | 1200 | PO | 5220 | 0.3 | 140 | 1 | 1.8 |
| 3 | Tridecanol | 1200 | BuO | 5800 | 2.1 | 140 | 0 | 2.0 |
| 4 | Tridecanol | 1200 | BuO | 5800 | 0.4 | 140 | 0 | 1.9 |
| C1 | Tridecanol | 1200 | PO | 5220 | 1.3 | 135 | 15 | 4.3 |
| C2 | Tridecanol | 700 | BuO | 5542 | 0.3 | 100 | 20 | 4.8 |
| C3 | Tridecanol | 700 | BuO | 5542 | 1.3 | 145 | 90 | 5.4 |

We claim:

1. A process for reacting epoxides with an initiator compound in the presence of a double metal cyanide compound as a catalyst, said process having a shortened induction period and comprising at least the stages (1) and (2):
   (1) activating the double metal cyanide compounds by adding the epoxide to a mixture of double metal cyanide compound and initiator compound at an internal reactor pressure of less than 200 mbar,
   (2) polymerizing an epoxide in the presence of a double metal cyanide compound activated according to stage (1),
   wherein at least 5% of the total amount of epoxide used in the process is added at an internal reactor pressure of less than 200 mbar,
   the initiator compound is chosen from organic dicarboxylic acids, aliphatic and aromatic diamines having from 1 to 4 carbon atoms in the alkyl radical, ammonia, and octanol, nonanol, decanol, undecanol, dodecanol, tridecanol, tetradecanol, pentadecanol, iso-octanol, iso-nonanol, iso-decanol, iso-undecanol, iso-dodecanol, iso-tridecanol, iso-tetradecanol, iso-pentadecanol or mixtures of $C_{13}$- to $C_{15}$-alcohols, and
   after activation of the double metal cyanide compound according to stage (1) the internal pressure is increased to pressures of 1 bar or higher.

2. A process as claimed in claim 1, wherein the internal reactor pressure is increased by adding inert gas after the activation of the double metal cyanide compound of stage (1).

3. A process as claimed in claim 1, wherein the epoxide is propylene oxide or butylene oxide or a mixture of one of these epoxides with at least one further epoxide.

* * * * *